US006987159B2

(12) United States Patent
Iwami

(10) Patent No.: US 6,987,159 B2
(45) Date of Patent: Jan. 17, 2006

(54) SOLID GOLF BALL

(75) Inventor: Satoshi Iwami, Kobe (JP)

(73) Assignee: Sumitomo Rubber Industries Limited, Hyogo (JP)

( * ) Notice: Subject to any disclaimer, the term of this patent is extended or adjusted under 35 U.S.C. 154(b) by 137 days.

(21) Appl. No.: 10/260,434

(22) Filed: Oct. 1, 2002

(65) Prior Publication Data

US 2003/0096662 A1 May 22, 2003

(30) Foreign Application Priority Data

Oct. 1, 2001 (JP) ............................ 2001-305643

(51) Int. Cl.
*A63B 37/12* (2006.01)
*A63B 37/00* (2006.01)

(52) U.S. Cl. .......................... 528/64; 528/63; 473/378

(58) Field of Classification Search ................. 528/63, 528/64; 473/378
See application file for complete search history.

(56) References Cited

U.S. PATENT DOCUMENTS 4,884,814 A 12/1989 Sullivan
6,309,313 B1 * 10/2001 Peter .......................... 473/378
6,486,261 B1 * 11/2002 Wu et al. ................ 525/332.6
6,520,870 B2 * 2/2003 Tzivanis et al. ............ 473/371
6,686,436 B2 * 2/2004 Iwami ......................... 528/63

FOREIGN PATENT DOCUMENTS

| | | |
|---|---|---|
| AU | 199923581 | * 10/1998 |
| EP | 0467622 | 4/1995 |
| JP | H 9-215778 | 8/1997 |

OTHER PUBLICATIONS

Thain, Science and Golf IV, pp. 319-327; 2002.*

* cited by examiner

*Primary Examiner*—David J. Buttner
(74) *Attorney, Agent, or Firm*—Birch, Stewart, Kolasch & Birch LLP

(57) ABSTRACT

A solid golf ball with a polyurethane cover having satisfactory formability and ball properties. The solid golf ball has a solid core, and a polyurethane cover for covering the solid core, wherein the difference in Shore D hardness between a center portion and a surface portion of the solid core is at least 15; the polyurethane cover has a thickness (t) of not more than 1.0 mm, and is formed from a cured urethane composition having Shore D hardness (D) of from 35 to 60; a product of the thickness(t) and the Shore D Hardness (D) of the cured urethane composition is ranging from 10 to 45($10 \leqq D \times t \leqq 45$); and the urethane composition contains an isocyanate group-terminated urethane prepolymer having the residual polyisocyanate monomer content of not more than 0.1 mass %, and an aromatic polyamine compound.

10 Claims, No Drawings

SOLID GOLF BALL

BACKGROUND OF THE INVENTION

1. Field of the Invention

The present invention relates to a multi-piece solid golf ball comprising a solid core coated with a polyurethane cover.

2. Description of the Related Art

An ionomer resin cover is primarily used as a cover for a solid golf ball in which a vulcanized rubber sphere is used as a solid core, because of its excellent durability. However, compared to the balata rubber cover, an ionomer resin cover tends to give a far inferior shot feeling to the golfer when hitting the golf ball.

To improve the shot feeling of the ionomer cover, a cover comprising an ionomer mixture has been proposed in Japanese Patent No. 2709950, where a hard ionomer which is a sodium or zinc salt of an olefin-unsaturated carboxylic acid copolymer is mixed with a soft ionomer which is a sodium or zinc salt of an olefin-unsaturated carboxylic acid-unsaturated carboxylic ester terpolymer. The shot feeling can be softened by blending this soft ionomer, but on the other hand, the advantages inherent in the ionomer cover are sacrificed, such as abrasion resistance (chunking properties) and resilience.

Recently, polyurethane has the focus of an inexpensive cover material that imparts to the golfer a shot feeling analogous to that imparted by the balata cover and possessing greater durability than the balata cover. For example, a polyurethane cover comprising a urethane prepolymer which has been hardened with a slow-reacting polyamine curing agent has been disclosed in Japanese Patent No. 2662909. A cover characterized in using a thermoplastic polyurethane elastomer has been proposed in Japanese Unexamined Patent Publication No. H09-215778.

However, there is a problem in the forming of the polyurethane cover. The problem is that it is difficult to form the cover because the rapid reaction between the urethane prepolymer and polyamine curing agent results in a precipitous increase in viscosity. Although the slow-reacting polyamine curing agent is used in Japanese Patent No. 2662909 to prevent the rapid increase in viscosity resulting from the progress of the reaction between the urethane prepolymer and polyamine curing agent, it is still sometimes difficult to form the cover, because of the rapid increases in viscosity, depending on the type of urethane prepolymer, type of curing agent, a combination thereof, and the like. Further improvement is also needed because the resilience, spin performance, and chunking properties are not altogether satisfactory, even when the cover can be formed.

On the other hand, although the use of a thermoplastic polyurethane elastomer results in better formability than the thermosetting polyurethane cover, the lack of three-dimensional cross-linking points results in inferior wear resistance, tear strength, and chunking properties compared to the thermosetting polyurethane cover or the ionomer cover.

SUMMARY OF THE INVENTION

In view of the foregoing, an object of the present invention is to provide a solid golf ball with a polyurethane cover having satisfactory formability and ball properties. The solid golf ball of the present invention comprises a solid core, and a polyurethane cover for covering the solid core, wherein the difference in Shore D hardness between a center portion and a surface portion of the solid core is at least 15;

the polyurethane cover has a thickness (t) of not more than 1.0 mm, and is formed from a cured polyurethane composition having Shore D hardness (D) of from 35 to 60;

the product of the thickness(t) and the Shore D Hardness (D) of the cured polyurethane composition ranges from 10 to 45($10 \leqq D \times t \leqq 45$); and the polyurethane composition comprises an isocyanate group-terminated urethane prepolymer having a residual polyisocyanate monomer content of not more than 0.1 mass %, and an aromatic polyamine compound.

DESCRIPTION OF THE PREFERRED EMBODIMENTS

The solid golf ball of the present invention comprises a solid core including a vulcanized rubber with a specific hardness distribution covered by a specific polyurethane cover. The polyurethane cover used in the present invention will be described first. The polyurethane cover used in the present invention is composed of a cured polyurethane composition which comprises an isocyanate-terminated urethane prepolymer having a residual polyisocyanate monomer content of not more than 0.1 mass % and an aromatic polyamine compound (hereinafter, referred to as "urethane cover composition").

The isocyanate-terminated urethane prepolymer used in the present invention has at least two isocyanate groups at the urethane prepolymer molecular chain, and has the residual polyisocyanate monomer content of not more than 0.1 mass %. The location of the isocyanate groups in the urethane prepolymer molecular chain is not particularly limited, and may be in either the main or side chain terminals of the urethane prepolymer molecule. The isocyanate-terminated urethane prepolymer can be obtained by reacting a polyisocyanate compound with a polyol so that the isocyanate group of the polyisocyanate compound is excess to the hydroxyl group of the polyol in the molar ratio.

"The residual polyisocyanate monomer" means an unreacted polyisocyanate compound remaining in the isocyanate-terminated urethane prepolymer. The content of the residual polyisocyanate monomer in the isocyanate-terminated urethane prepolymer is defined by (mass of polyisocyanate monomer remaining in the isocyanate group-terminated urethane prepolymer/total mass of the isocyanate group-terminated urethane prepolymer)×100, and can be determined by gas chromatography. A polyisocyanate monomer content over 0.1 mass % tends to result in precipitation in the polyurethane cover composition. Although the mechanism involved in the precipitation is not apparent, it is assumed that the reaction products between the residual polyisocyanate monomer and the polyamine curing agent precipitates. The above precipitation causes a non-uniform reaction between the isocyanate group-terminated urethane prepolymer and the polyamine curing agent, thus making it difficult to produce a uniform polyurethane cover. A non-uniform polyurethane cover will affect the cover durability and will lower the chunking properties in particular. The spin rate also tends to be lower when the golf ball is wet.

The polyisocyanate compound used as a raw material for the isocyanate group-terminated urethane prepolymer is not particularly limited. Examples of the polyisocyanate compound are an aromatic diisocyanate such as 2,4-tolylene diisocyanate, 2,6-tolylene diisocyanate, mixtures (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), and para-phenylene diisocyanate (PPDI); and an alicyclic or aliphatic diisocyanate such as 4,4'-dicyclohexylmethane diisocyanate (hydrogenated MDI), hexamethylene diisocyanate (HDI), and isophorone diisocyanate (IPDI). The polyisocyanate compound can be used either alone or in combinations of two or more. Of these, TDI and hydrogenated MDI are particularly preferable in view of imparting the good mechanical properties to the polyurethane cover, as well as imparting the good resilience, weather resistance, and water resistance to the golf ball.

Examples of the polyols used as raw material for the isocyanate group-terminated urethane prepolymer include any low-molecular weight compound or high-molecular weight compound with a plurality of hydroxyl groups. Examples of the low-molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylolpropane, hexanetriol. Examples of the high-molecular weight polyol include a polyether polyol which can be obtained by a reaction between alkylene oxides and an initiator with active hydrogen; a condensed polyester polyol obtained by the condensation of a dibasic acid such as adipic acid and glycol or a triol; a lactone polyesterpolyol obtained by ring-opening polymerization of a lactam such as ε-caprolactam; a polycarbonate diol synthesized using cyclic diols; and a polymer polyol such as acrylic polyol obtained by the introduction of suitable hydroxyl groups into an acrylic copolymer. Examples of the polyether polyol include polyoxyethylene glycol(PEG), polyoxypropylene glycol (PPG), and polyoxytetramethylene glycol (PTMG). Examples of the condensed polyester polyol include polyethylene adipate (PEA), polybutylene adipate (PBA), and polyhexamethylene adipate (PHMA); examples of the lactone polyester polyol include poly-ε-caprolactone (PCL). In view of their better resilience and water resistance, the polyether polyol are preferable, and the polyoxytetramethylene glycol is even more preferable.

Accordingly, the isocyanate group-terminated urethane prepolymer is preferably at least one selected from the group consisting of a TDI urethane prepolymer, a MDI urethane prepolymer, and a hydrogenated MDI urethane prepolymer. Specifically, the TDI urethane prepolymer, the MDI urethane prepolymer, the hydrogenated MDI urethane prepolymer, or a mixture of the TDI urethane prepolymer and the hydrogenated MDI urethane prepolymer are preferably used.

"TDI urethane prepolymer" means the isocyanate group-terminated urethane prepolymer obtained by a reaction between TDI or TDI-based polyisocyanate compound and a polyol (preferably polytetramethylene glycol). "MDI urethane prepolymer" means the isocyanate group-terminated urethane prepolymer obtained by a reaction between MDI or MDI-based polyisocyanate compound and a polyol (preferably polytetramethylene glycol). "Hydrogenated MDI urethane prepolymer" means the isocyanate group-terminated urethane prepolymer obtained by a reaction between hydrogenated MDI or a polyisocyanate compound based thereon and a polyol (preferably polytetramethylene glycol).

Specific examples of the isocyanate group-terminated urethane prepolymer having the residual polyisocyanate monomer content of not more than 0.1 mass % include Adiprene LF900A and LF950A, Adiprene LF800A, and Adiprene LF700D commercially available from Uniroyal Co.

The aromatic polyamine compound used in the present invention means, for example, a compound having at least two amino groups bonded to the aromatic ring, and may include a phenylene diamine type with two or more amino groups bonded to one aromatic ring, or a polyaminobenzene type having two or more aminophenyl groups with one amino group bonded to one aromatic ring. The polyaminobenzene types are preferred because of fewer effects caused by steric hindrance and fewer effects between amino groups. The polyaminobenzene type may include diaminobenzene with two aminophenyl groups directly bonded each other. Alternatively, the polyaminobenzene where the two aminophenyl groups may be bonded via a lower alkylene group or alkylene oxide groups can be also used. Among these, typically preferred is a diaminophenylalkane with two aminophenyl groups bonded via lower alkylene groups, especially preferred is 4,4'-diaminodiphenylmethane represented by the following general formula and derivatives thereof. That is because, in the case of p-isomers in which the molecular chain between the aminophenyl groups is not so long, the benzene nuclei in the hard segments can be arranged side-by-side linearly in a plane, and hence it is possible to efficiently make use of the intermolecular cohesive energy between the urethane bonds, urea bonds, and hydrogen bonds between benzene nuclei. As a result, the resilience is improved. In addition, the cover durability and the cover strength such as chunking properties tend to be improved.

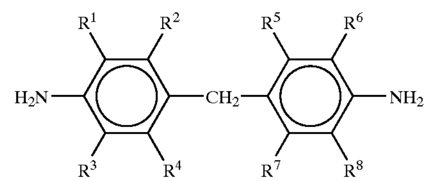

(where $R^1$ to $R^8$ are each independently an alkyl group having 1 to 9 carbon atoms, halogen atom, or hydrogen atom).

Specific examples of the alkyl group having 1 to 9 carbon atoms include, a linear alkyl group such as methyl, ethyl, n-propyl, n-butyl, n-pentyl, n-hexyl, n-heptyl, n-octyl, and n-nonyl; a branched alkyl group such as iso-propyl, iso-butyl, sec-butyl, tert-butyl, neopentyl; and alicyclic alkyl group such as cyclopropyl and cyclohexyl. Of these, methyl and ethyl are preferred because of their lower steric hindrance. Examples of the halogen atom include fluorine, chlorine, bromine, and iodine. Chlorine and bromine are preferred. The $R^1$ to $R^8$ such as alkyl groups and halogen atom may be same or different each other. Examples of the aforementioned 4,4'-diaminodiphenylmethane derivatives include 3,3'-dichloro-4,4'-diaminodiphenylmethane, 3,3'-dimethyl-5,5'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, and 2,2',3,3'-tetrachloro-4,4'-diaminodiphenylmethane. 2,2'-dichloro-3,3',5,5'-tetraethyl-4,4'-diaminodiphenylmethane is particularly preferable because of its low toxicity.

Although the amount in which the aromatic polyamine curing agent is blended in the urethane cover composition is not particularly limited, the aromatic polyamine compound is preferably blended in an amount resulting in $NH_2$/NCO=0.85 to 1.15 (molar ratio) relative to the isocyanate group-terminated urethane prepolymer having the residual polyisocyanate monomer content of not more than 0.1 mass %.

The urethane cover composition used in the present invention may contain a well-known catalyst conventionally used in urethane reactions. Examples of the catalyst include a monoamine such as triethylamine, N,N-dimethylcyclohexylamine; a polyamine such as N,N,N',N'-tetramethylethylenediamine, N,N,N',N",N"-pentamethyldiethylenetriamine; a cyclic diamines such as 1,8-diazabicyclo[5,4,0]-7-undecene (DBU), triethylenediamines; a tin catalyst such as dibutyl tin dilaurate, dibutyl tin diacetate; and an organic carboxylic acid such as azelaic acid, oleic acid, adipic acid. Azelaic acid is preferred.

In addition to the aforementioned isocyanate group-terminated urethane prepolymer and the aromatic polyamine compound, the urethane cover composition may further contain, if needed, a filler such as barium sulfate, a colorant such as titanium dioxide, and an additive such as a dispersant, an antioxidant, an UV absorbent, a photostabilizer, a fluorescent material, and a fluorescent brightener, as long as the desired properties of the golf ball cover are not thereby deteriorated.

The cured urethane cover composition with the aforementioned composition used for the golf ball cover of the present invention preferably has Shore D hardness of at least 35, preferably at least 40, and more preferably at least 42 (the hardness of the cured urethane composition is sometimes referred to as "slab hardness"). If the Slab hardness is less than 35, the polyurethane cover will be too soft, resulting in the low resilience. On the other hand, the larger slab hardness means the harder cover. Since the excessively hard cover results in the golf ball which imarts a hard shot feeling to the golfer and which cannot ensure the satisfactory controllability in approach shots because of too low spin rate. Therefore, the upper limit of the slab hardness (Shore D hardness) is not more than 60, preferably not more than 58, and more preferably not more than 55.

The polyurethane cover has the thickness(t) of not more than 1.0 mm, and preferably not more than 0.9 mm, and the product (D×t) of the thickness(t) and the slab hardness (D) of the cured urethane cover composition is at least 10, preferably at least 20, and more preferably at least 21, but not more than 45, preferably not more than 40, and more preferably not more than 38. The thin polyurethane cover can increase the proportion of the solid core made of the vulcanized rubber, thereby compensating for the loss of the golf ball resilience caused by the soft polyurethane cover. On the other hand, if the polyurethane cover is too thin, it will be difficult to form the polyurethane cover. Further, the excessively thin polyurethane cover tends to be torn or worn by shot. In this case, the solid core is supposed to be exposed. The thickness of the polyurethane cover must therefore be determined in relation to the slab hardness of the cured urethane composition as the cover material. If D×t is less than 10, the cover material will be soft and the resultant polyurethane cover will be thin, thus failing to fulfill the function of the cover.

Because the curing reaction of the urethane cover composition must be carried out in a state where the isocyanate group-terminated urethane prepolymer and the aromatic polyamine compound are mixed homogeneously, the two materials are preferably heated and mixed at such a temperature that the aromatic polyamine compound is in a molten state. For example, the urethane prepolymer is heated around the temperature where the aromatic amine compound turned into a molten state, and then mixed with the aromatic polyamine compound in a molten state.

The solid core used in the present invention may include a vulcanized rubber with a single layered structure, or two or more layered structure, which are conventionally used for solid cores in multi-piece solid golf balls, but the following solid core is preferred in combination with the polyurethane cover used in the invention.

That is, the solid core preferably has a diameter of 40.8 mm to 42.2 mm, where the difference in hardness between the center portion and the surface portion of the solid core (center hardness<surface hardness) is at least 15 by Shore D. As described above, since the golf ball of the present invention has the thin polyurethane cover, the solid core can have the large diameter ranging from 40.8 to 42.2 mm. Thus, it is possible to fully make use of the resilience of the solid core. Further, the soft shot feeling and the high resilience is imparted to the golf ball by adjusting the difference in the Shore D hardness between the center portion and the surface portion of the solid core to at least 15.

As the diameter of the solid core is getting larger, the vulcanized rubber(solid core) occupies the larger proportion of the golf ball. Thus, it will be easier to obtain the golf ball with high resilience and also adjust the difference in the Shore D hardness between the center portion and the surface portion to at least 15. Accordingly, the solid core preferably has the diameter of not less than 40.8 mm, more preferably not less than 41.0 mm, more preferably not less than 41.2 mm. The upper limit of the diameter is preferably not more than 42.2 mm, and more preferably not more than 41.8 mm. If the diameter is more than 42.2 mm, the polyurethane cover is too thin, because the size of the golf ball is specified. Thus, it will be difficult to mold the polyurethane cover.

It is possible to impart the soft shot feeling to the golf ball without sacrificing the resilience by lowering the hardness of the center portion of the solid core, and enhancing the hardness from the center portion toward the surface portion of the solid core. In other words, as the difference in the Shore D hardness between the center portion and the surface portion is getting larger, the resilience of the golf ball tends to be greater. Also, the flight distance can be increased, particularly with iron shots, because the shot angle can be increased and the spin rate can be reduced in the early stage of the flight. For these reasons, the difference in the Shore D hardness between the center portion and the surface portion is at least 15, preferably at least 17, and more preferably at least 20. On the other hand, the difference in the Shore D hardness of about 30 causes a problem of manufacturing. Thus, the upper limit of the difference is preferably 28. Specifically, the solid core has preferably the Shore D hardness of from 20 to 40 at the center portion, and the Shore D hardness of from 45 to 65 at the surface portion, provided that the difference in the hardness between the two is at least 15.

The solid core used in the present invention preferably has the deformation amount, which indiates the softness of the solid core as a whole, of at least 2.60 mm, more preferably at least 2.70 mm, most preferably 2.75 mm when applying 98N(10 kgf) as an initial load to 1275N(130 kgf) as a final load to the solid core. The upper limit of the deformation amount is preferably 3.30 mm, more preferably 3.20 mm, and most preferably 3.00 mm.

The solid core of the solid golf ball of the present invention has no particular limitation, as long as it meets the aforementioned conditions, and may include, for example, a vulcanized body of the rubber composition which is conventionally used for the core of the solid golf ball, As the rubber composition for the core, typically preferred is the rubber composition comprising a diene rubber such as butadiene rubber (BR), ethylene-propylenediene terpolymers (EPDM), isoprene rubber (IR), styrene butadiene rubber (SBR), or acrylonitrile butadiene rubber (NBR); a crosslinking initiator such as an organic peroxide; a co-crosslinking agent such as an unsaturated carboxylic acid and/or metal salt thereof; and other additives such as specific gravity regulators where necessary.

Examples of the organic peroxides include dicumyl peroxide, 1,1-bis(t-butylperoxy)-3,5-trimethylcyclohexane, 2,5-dimethyl-2,5-di(t-butylperoxy)hexane, and di-t-butyl peroxide, among which dicumyl peroxide is preferred. The organic peroxide is preferably blended in an amount of 0.3 to 3.0 mass parts, and preferably 0.5 to 1.5 mass parts, with respect to 100 mass parts of the diene rubber. Examples of the unsaturated carboxylic acid include α,β-unsaturated carboxylic acids having $C_3$ to $C_8$ such as acrylic acid or methacrylic acid. Examples of the metal salts thereof include monovalent or divalent metal salt such as zinc or magnesium. The unsaturated carboxylic acid and/or the metal salt thereof are preferably used in an amount of 20 to 50 mass parts, and preferably 25 to 40 mass parts, with respect to 100 mass parts of the diene rubber.

The conditions for the vulcanization should be determined depending on the rubber composition, but the vulcanization is preferably carried out for 10 to 25 minutes at the temperature of 160 to 180° C. in order to obtain the solid core which meets the aforementioned hardness.

The solid golf ball of the present invention is composed of a combination of the aforementioned solid core and the polyurethane cover. The golf ball of the present invention is preferably a two-piece golf ball comprising a solid core with the single layered structure, namely the vulcanized rubber sphere made from the single rubber composition, and the polyurethane cover. The two-piece golf ball preferably has the deformation amount of at least 2.50 mm, more preferably at least 2.60 mm, and most preferably at least 2.65 mm, and preferably the deformation of not more than 3.20 mm, more preferably not more than 3.10 mm, and most preferably not more than 2.90 mm when applying a load from 98N(10 kgf) as an initial load to 1275 N(130 kgf) as a final load to the two-piece golf ball. The deformation of the golf ball corresponding to the polyurethane cover hardness, further in view of the solid core hardness and the like, can be adjusted to within the aforementioned range to produce the best combination of the solid core and the polyurethane cover (good spin retention with soft feeling and high resilience).

The solid golf ball of the present invention can be produced using a conventional method for manufacturing the golf ball covered with a hard polyurethane cover. Specifically, the urethane cover composition is charged into the hemispherical mold where the solid core, which is the rubber body by vulcanizing and molding the rubber composition, is held, and then the hemispherical mold is inverted to mate with another hemispherical mold, into which the same urethane cover composition has been charged to form the polyurethane cover.

As required, the polyurethane cover is formed with a multiplicity of dimples at the surface thereof, during forming the polyurethane cover. Further, the golf ball of the present invention is usually provided with a paint finish, a marking stamp, or the like when launched into the market in order to enhance the attractiveness and commercial value.

In the present invention, the polyurethane cover may be composed of a single layer, or a plurality of layers.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Measurement and Evaluation]

1. Compression Deformation Amount (mm)

The deformation (mm) of the golf balls or the solid cores was measured when applying a load from 98N(10 kgf) as an initial load to 1275 N (130 kgf) as a final load to the golf balls or the solid cores.

2. Shore D Hardness at the Center Portion and the Surface Portion of the Solid Core The Shore D hardness was measured using a spring type of Shore D hardness meter, as stipulated in ASTM-D2240. The hardness at the center portion was determined by dividing the solid core into two halves, and then contacting a measuring-pick with the center portion of the cut surface. The surface hardness of the solid core was determined by contacting a measuring-pick to the surface of the solid core.

3. Shore D Hardness of the Cured Urethane Composition (Slab Hardness)

Each of the urethane cover compositions was formed into sheets each having a thickness of approximately 2 mm by hot-press-molding. The resulting sheets were stored for 2 weeks at 23° C. At least three of the resulting sheets were stacked one upon another, so as to avoid being affected by the measuring substrate on which the sheets were placed, and the stack were subjected to the measurements using a spring-type Shore D hardness tester stipulated in ASTM-D2240.

4. Resilience Index

Each golf ball was struck with a 200 g aluminum cylinder at the speed of 45 m/sec, the speed of the cylinder and the golf ball were respectively measured before and after being struck, and the resilience coefficient of the golf balls was calculated based on the speeds and weight of the cylinder and the golf balls. The measurement was carried out 5 times, and the average of 5 times was regarded as the repulsion coefficient of the golf ball. The repulsion coefficient of the golf ball was represented as an index relative to the repulsion coefficient of the golf ball No. 6 representing 100.

5. Spin Rate (rpm)

Each golf ball was hit with a sand wedge club attached to a swing robot manufactured by Truetemper Co. at the head speed of 20 m/sec, and the spin rate (rpm) was determined by continuously taking a photograph of the spinning golf ball.

6. Chunking (Abrasion Resistance)

Each golf ball was hit in two portions each at the head speed of 36 m/sec, with a commercially available pitching wedge attached to the robot machine. The conditions of the two struck portions were observed and ranked according to the following three criteria. The worse result of the two portions was regarded as the result of the golf ball.

G(Good): There were a few scratches, which were barely noticeable, on the surface of the golf ball.

F(Fair): There were clearly noticeable scratches and some scuffing on the surface of the golf ball.

P(Poor): The surface of the golf ball was torn, with obvious scuffing.

7. Shot Angle

Each golf ball was hit with a W#1 driver attached to a swing robot manufactured by TrueTemper Co., at the head speed of 40 m/sec, and the shot angle was measured immediately after the golf ball was hit. The average was determined from 5 measurements.

8. Flight Distance

Each golf ball was hit with a No. 1 wood club (driver, W#1) attached to a swing robot manufactured by Golf Laboratory Co., at the head speed of 50 m/sec. The flight distance was measured in terms of the total distance including the carry and the run. The carry is the distance from the hitting point to the point where the golf ball fell to the ground. The run is the distance from the point where the golf ball fell to the ground to the point where the golf ball stopped after landing. The distance for each golf ball was measured 12 times, and the average distance was regarded as the result for each golf ball. The distance was reduced to an index relative to the distance of the golf ball No.6 regarded as 100. The golf ball No.6 had a thermoplastic polyurethane elastomer cover (D), as described below.

[Manufacture of Golf Balls]

1. Production of Solid Core

The rubber composition shown in Table 1 was vulcanized and formed under the vulcanizing conditions shown in Table 1, to obtain spherical solid cores(a to e) having a diameter of 41.2 to 41.8 mm. Table 1 gives the results for the difference in the Shore D hardness between the center portion and the surface portion and the compressive deformation of the resulting solid cores. In table 1, the high cis polybutadiene BR-18 by JSR was used as the butadiene rubber, a diphenyl disulfide by Sumitomo Seika Co. was used as the diphenyl disulfide, and a product by Nippon Fats & Oil was used as the dicumyl peroxide.

TABLE 1

| Type | | a | b | c | d | e |
|---|---|---|---|---|---|---|
| Core composition | Butadiene rubber | 100 | 100 | 100 | 100 | 100 |
| | Zinc acrylate | 33 | 33 | 33 | 33 | 33 |
| | Zinc oxide | 12.0 | 12.5 | 12.0 | 12.0 | 11.5 |
| | Diphenyl disulfide | 0.5 | 0.5 | 0.5 | 0.5 | 0.5 |
| | Dicumyl peroxide | 1.0 | 1.0 | 1.0 | 1.0 | 1.0 |
| Vulcanization conditions (° C. × min.) | | 170 × 15 | 170 × 15 | 140 × 20<br>165 × 8 | 150 × 30 | 170 × 15 |
| Core diameter(mm) | | 41.2 | 41.8 | 41.2 | 41.2 | 40.0 |
| Difference between Surface hardness and center hardness (shore D) | | 20 | 24 | 3 | 10 | 18 |
| Compression deformation (mm) | | 2.95 | 3.00 | 2.70 | 3.25 | 2.85 |

2. Production of Cover

The solid cores(a to e) were covered with the cover compositions A to F shown in table 2, and cured under the conditions shown in table 2 to obtain the golf balls No. 1 to 11 shown in table 3.

TABLE 2

| Cover material | | A | B | C | D | E | F |
|---|---|---|---|---|---|---|---|
| Urethane pre-polymer | Adiprene LF900A | 100 | 50 | — | — | — | — |
| | Adiprene LF950A | — | 50 | — | — | — | — |
| | Vibrathane B635 | — | — | 50 | — | — | — |
| | Vibrathane B670 | — | — | 50 | — | — | — |
| | Adiprene LF800A | — | — | — | — | 100 | — |
| | Adiprene LF700D | — | — | — | — | — | 100 |
| Curing agent | Lonzacure M-CDEA | 15.8 | 20.9 | — | — | 12.4 | 35.5 |
| | Elasmer 250P | — | — | 48.3 | — | — | — |
| Elastomer | Pandex T1198 | — | — | — | 100 | — | — |
| Titanium oxide | | 2 | 2 | 2 | 2 | 2 | 2 |
| Curing time (minutes) | | 10 | 10 | 10 | — | 15 | 6 |
| Mold temperature (° C.) | | 80 | 80 | 80 | — | 80 | 80 |
| Prepolymer temperature (° C.) | | 80 | 80 | 80 | — | 80 | 80 |
| Curing agent temperature (° C.) | | 120 | 120 | 120 | — | 120 | 120 |
| Slab hardness (Shore D) | | 42 | 47 | 52 | 53 | 30 | 70 |

Note on Table 2:

Adiprene LF900A: TDI (NCO content=3.7%)-PTMG prepolymer having not more than 0.1% of free TDI, available from Uniroyal Co.

Adiprene LF950A: TDI (NCO content=6.1%)-PTMG prepolymer having not more than 0.1% of free TDI, available from Uniroyal Co.

Adiprene LF800A: TDI (NCO content=2.9%)-PTMG prepolymer having not more than 0.1% of free TDI, available from Uniroyal Co.

Adiprene LF700D: TDI (NCO content=8.3%)-PTMG prepolymer having not more than 0.1% of free TDI, available from Uniroyal Co.

Vibrathane B635: MDI (NCO content=7.8%)-PTMG prepolymer having more than 0.1% of free MDI, available from Uniroyal.

Vibrathane B670: MDI (NCO content=11.2%)-PTMG prepolymer having more than 0.1% of free MDI, available from Uniroyal.

Lonzacure M-CDEA: 4,4'-methylene bis(3-chloro-2,6-diethylaniline) (amine value of 297 mgKOH/g) by Uniroyal.

Elasmer 250P: Polytetramethyleneoxide aminobenzoate (amine value 249.4 mgKOH/g) by Air Products.

Pandex T1198: Adipate type thermoplastic polyurethane elastomer by Dainippon Ink Ind. Co.

The golf balls thus produced were evaluated in terms of deformation, resilience index, spin rate, shot angle, chunking, and hitting distance. The results are given in Table 3.

TABLE 3

| Example No. | | 1 | 2 | 3 | 4 | 5 | 6 | 7 | 8 | 9 | 10 | 11 |
|---|---|---|---|---|---|---|---|---|---|---|---|---|
| Core | Type | a | a | b | b | a | a | c | d | e | e | e |
| | Diameter (mm) | 41.2 | 41.2 | 41.8 | 41.8 | 41.2 | 41.2 | 41.2 | 41.2 | 40.0 | 40.0 | 40.0 |
| | Deformation (mm) | 2.95 | 2.95 | 3.00 | 3.00 | 2.95 | 2.95 | 2.70 | 3.25 | 2.85 | 2.85 | 2.85 |
| | Hardness difference | 20 | 20 | 24 | 24 | 20 | 20 | 3 | 10 | 18 | 18 | 18 |
| Cover | Type of material | A | B | A | B | C | D | B | B | B | E | F |
| | Slabhardness (D) | 42 | 47 | 42 | 47 | 52 | 53 | 47 | 47 | 47 | 30 | 70 |
| | Thickness (t)(mm) | 0.8 | 0.8 | 0.5 | 0.5 | 0.8 | 0.8 | 0.8 | 0.8 | 1.4 | 1.4 | 1.4 |
| | D × t | 33.6 | 37.6 | 21.0 | 23.5 | 41.6 | 42.4 | 37.6 | 37.6 | 65.8 | 42.0 | 98.0 |
| Ball | Deformation (mm) | 2.85 | 2.75 | 2.90 | 2.80 | 2.55 | 2.50 | 2.50 | 3.05 | 2.65 | 2.85 | 2.35 |
| | Resilience index | 103 | 106 | 104 | 105 | 101 | 100 | 102 | 99 | 97 | 95 | 101 |
| | Shot angle | 10.7 | 10.9 | 10.8 | 11.0 | 10.2 | 10.1 | 10.0 | 10.3 | 10.2 | 10.0 | 10.5 |
| | Spin rate(rpm) | 2800 | 2650 | 2750 | 2600 | 2700 | 2650 | 3050 | 2800 | 2850 | 3100 | 2400 |
| | Flight distance index | 102 | 105 | 103 | 104 | 101 | 100 | 98 | 98 | 97 | 95 | 99 |
| | Chunking | G | G | G | G | F | P | G | G | G | G | G |

As apparent from Table 3, golf balls Nos. 1 to 4 all had excellent chunking properties and high resilience without any loss of spin. In golf balls Nos. 1 to 4, the difference in the hardness between the center potion and the surface portion was at least 15, and urethane prepolymers with a residual polyisocyanate monomer content of not more than 0.1 mass % were used as the structural components of the urethane covers. The polyurethane covers were not thicker than 1.0 mm, and the slab hardness was between 35 and 60.

Golf ball No. 5 and No. 6 were inferior in chunking properties. This is because golf ball No. 6 used the thermoplastic polyurethane elastomer as the cover, and golf ball No. 5 had a polyurethane cover which used the urethane prepolymer containing more than 0.1 mass % of the residual isocyanate monomer. Golf ball No. 7 and No. 8 showed shorter fight distance and higher spin rate, because the differences in the hardness between the center portion and the surface portion of the solid core were less than 15 in golf balls No. 7 and No. 8.

Golf balls Nos. 9 to 11 had the polyurethane cover as thick as 1.4 mm. Thus, the resilience index of the golf balls No. 9 to No. 11 were low. Especially, golf ball No. 9 used the polyurethane cover E, which had too low slab hardness, thus the spin rate increased and the flight distance was considerably shorter. On the other hand, golf ball No. 11 used the polyurethane cover F, which had too high slab hardness, thus the spin rate decreased and the controllability of the golf ball was lowered. Although the slab hardness of the polyurethane in golf ball No. 9 was within the range of the present invention, the cover was too thick, resulting in the poor resilience.

In the present invention, the hardness distribution of the solid core is optimized to enhance the resilience, the hardness and thickness of the polyurethane cover are adjusted to ensure the controllability and the resilience, and the urethane prepolymer structural component of the urethane cover material and the residual monomer content are specified to ensure good chunking properties. According to the present invention, it is possible to achieve a soft shot feeling and better controllability, as well as the durability and the resilience, which are not compatible with the shot feeling and controllability. This application is based on Japanese Patent application No. 2001-305643 filed on Oct. 1, 2001, the contents of which are hereby incorporated by reference.

What is claimed is:

1. A solid golf ball comprising a solid core, and a polyurethane cover for covering the solid core, wherein the difference in Shore D hardness between a center portion and a surface portion of the solid core is at least 15 and the deformation amount of the core is 2.60 to 3.00 mm when applying a load from 98N as an initial load to 1275N as a final load to the solid core;

the polyurethane cover has a thickness (t) of not more than 1.0 mm, and is formed from a cured urethane composition having Shore D hardness (D) of from 35 to 60;

a product of the thickness(t) and the Shore D Hardness (D) of the cured urethane composition is ranging from 10 to 45($10 \leqq D \times t \leqq 45$) ; and the urethane composition comprises an isocyanate group-terminated urethane prepolymer having the residual polyisocyanate monomer content of not more than 0.1 mass %, and an aromatic polyamine compound.

2. The solid golf ball according to claim 1, wherein the aromatic polyamine compound is a 4,4'-diaminodiphenylmethane represented by the following general formula or a derivative thereof.

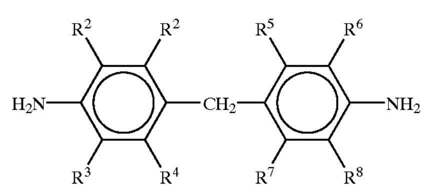

(where $R^1$ to $R^8$ are each independently an alky group having 1 to 9 carbon atoms, halogen atom, or hydrogen atom).

3. The solid golf ball according to claim 2, wherein the aromatic polyamine compound is 2,2'-dichloro-3,3',5,5'-tetraethyl-4,4'-diaminodiphenylmethane.

4. The solid golf ball according to claim 1, wherein the isocyanate group-terminated urethane prepolymer is at least one selected from the group consisting of a TDI polyurethane prepolymer, a MDI polyurethane prepolymer, and a hydrogenated MDI urethane prepolymer.

5. The solid golf ball according to claim 1, wherein the deformation is 2.50 to 3.20 mm when applying a load from 98N as a initial load to 1275N as a final load to the solid golf ball.

6. The solid golf ball according to claim 1, wherein the solid core has a diameter of from 40.8 mm to 42.2 mm.

7. The solid golf ball according to claim 1, wherein the product of the thickness (t) and the Shore D Hardness (D) of the cured urethane composition is ranging from 21 to 38($21 \leqq D \times t \leqq 38$).

8. The solid golf ball according to claim 1, wherein the solid golf ball is a two-piece golf ball.

9. The solid golf ball according to claim 1, wherein the difference in Shore D hardness between the center portion and the surface portion of the solid core is within the range from 20 to 28.

10. The solid golf ball according to claim 1, wherein the cured urethane composition has Shore D hardness (D) of from 42 to 55.

* * * * *